United States Patent [19]

Tanaka et al.

[11] 4,286,014

[45] Aug. 25, 1981

[54] COMPOSITE SHEET MATERIAL

[75] Inventors: Minoro Tanaka, Gifu; Kenkichi Yagi, Kyoto; Kitao Shimizu, Kobe, all of Japan

[73] Assignee: Toray Industries, Incorporated, Tokyo, Japan

[21] Appl. No.: 6,578

[22] Filed: Jan. 26, 1979

[30] Foreign Application Priority Data

Jan. 31, 1978 [JP] Japan .................................. 53-88858
Jun. 28, 1978 [JP] Japan .................................. 53-77358

[51] Int. Cl.$^3$ ........................ B32B 27/00; C08K 5/34
[52] U.S. Cl. .................................... 428/290; 260/30.2; 260/30.8 R; 260/32.6 N; 260/32.6 NR; 264/128; 528/61
[58] Field of Search ........................ 428/290; 264/128; 156/85; 8/17; 260/30.8 R, 30.8 DS, 32.6 N, 32.6 NR, 30.2; 528/61

[56] References Cited

U.S. PATENT DOCUMENTS

| | | | |
|---|---|---|---|
| 2,957,852 | 10/1960 | Frankenburg et al. | 260/32.6 N |
| 3,202,636 | 8/1965 | Windemuth et al. | 260/32.6 NR |
| 3,432,456 | 3/1969 | Oertel et al. | 260/30.8 R |
| 3,461,101 | 8/1969 | Oertel et al. | 528/61 |
| 3,562,374 | 2/1971 | Okamoto et al. | 264/128 |
| 3,630,987 | 12/1971 | Thoma et al. | 260/32.6 NR |
| 3,640,937 | 2/1972 | Thoma et al. | 260/30.8 DS |
| 3,706,613 | 12/1972 | Toki et al. | 156/85 |
| 3,708,453 | 1/1973 | Thoma et al. | 260/30.2 |
| 3,899,292 | 8/1975 | Okazaki et al. | 8/17 |
| 3,899,623 | 8/1975 | Okazaki et al. | 260/30.8 X |

FOREIGN PATENT DOCUMENTS 917450  2/1963  United Kingdom .

*Primary Examiner*—Thomas J. Herbert, Jr.
*Attorney, Agent, or Firm*—Miller & Prestia

[57] ABSTRACT

A polyurethane elastomer which comprises a reaction product of (A) a polymeric diol having a molecular weight of about 800–5000, (B) a mixture of organic diisocyanates wherein about 2–70 mol % is composed of aliphatic diisocyanate (said aliphatic diisocyanate having no direct bond between an aromatic ring and an isocyanate group) and wherein the balance 98–30 mol % is composed of aromatic diisocyanate which includes a direct bond between an aromatic ring and an isocyanate group, and (C) a chain extender comprising hydrazine and/or a derivative having the formula $NH_2NHR$ and another chain extender having two functional groups constituting amino and/or hydroxyl groups, and wherein about 30–80% of the carbon atoms which are bonded to nitrogen atoms constituting the ureylene and/or urethane bonds of said polyurethane elastomer constitute benzene and/or naphthalene ring skeletons.

and wherein about 2–70% of the ureylene bonds of said polyurethane elastomer are formed by the reaction of aliphatic diisocyanate and hydrazine and/or its derivative having the formula $NH_2NHR$.

16 Claims, No Drawings

COMPOSITE SHEET MATERIAL

This invention relates to a novel composite sheet material comprising a fibrous sheet and a polyurethane elastomer. The product has much improved durability on weathering and possesses excellent resistance to abrasion and pilling even after extended periods of wear.

In U.S. Pat. Nos. 3,562,374, 3,706,613 and 3,899,292 we have heretofore disclosed synthetic leathers comprising superfine filaments or fibers obtained from so-called islands-in-a-sea type multicomponent filaments or fibers together with a polyurethane elastomer. It is well known that the synthetic suede obtained by the methods described above has earned an excellent reputation in the textile art, and has become a well known apparel material under the trademark "ULTRASUEDE". It has excellent qualities such as fine naps giving a graceful appearance, a supple touch, ease of handling, adaptability to a wide color variety, good color fastness, lightness and a high manufacturing yield. In addition to the excellent qualities as described above, it is still further desired to obtain a composite sheet material having excellent durability., i.e., the ability to keep its excellent properties for a long time, and to provide excellent pilling and abrasion resistance.

We have intensely investigated this interaction of the fibers and the porous structure of the polyurethane elastomer and have found that an elaborate and dense structure gives the synthetic leather improved durability but makes the synthetic leather less flexible, less supple and more difficult to raise the naps during the maufacturing process. To satisfy all of these contradictory properties at once, we have surprisingly discovered that the polyurethane elastomer must have a unique and specific structure in order to give improved durability to the synthetic leather while at the same time keeping a flexible and supple touch and a graceful appearance.

OBJECTS OF THE INVENTION

Accordingly, it is an object of this invention to provide a composite sheet material having good hand characteristics, a supple touch, a graceful appearance, improved abrasion and pilling-resistance, and the durability to keep its initial excellent qualities for a long term. It is another object of this invention to provide a composite sheet material which does not discolor when exposed to exhaust gases of motor vehicles or nitrogen oxide gas, for example.

BRIEF DESCRIPTION OF THE INVENTION

The above objects are accomplished by providing a composite sheet material comprising a fibrous sheet which is impregnated and/or coated with a polyurethane elastomer of a particular and unique structure. Specifically, said polyurethane elastomer comprises a reaction product of (A) a polymeric diol having a molecular weight of about 800–5000, (B) a mixture of organic diisocyanates wherein about 2–70 mol % is composed of aliphatic diisocyanate (said aliphatic diisocyanate having no direct bond between an aromatic ring and an isocyanato group) and wherein the balance 98–30 mol % is composed of aromatic diisocyanate which includes a direct bond between an aromatic ring and an isocyanate group, and (C) a chain extender comprising hydrazine and/or a derivative having the formula (I) and another chain extender having two functional groups constituting amino and/or hydroxyl groups. and wherein about 30–80% of the carbon atoms, which are bonded to nitrogen atoms constituting the ureylene and/or urethane bonds of said polyurethane elastomer, constitute benzene and/or naphthalene ring skeletons, and wherein about 2–70% of the ureylene bonds of said polyurethane elastomer are formed by the reaction of aliphatic diisocyanate and hydrazine and/or its derivatives having the formula (I).

$$NH_2NHR \quad (I)$$

(wherein R is a substituent selected from the group consisting of hydrogen, an alkyl group having 1–12 carbon atoms, an aryl group, an aralkyl group, an acyl group containing an amino group or groups having the formula $-A-(ZA)_n-NHNH_2$ (wherein A is a substituent selected from the group consisting of CO, CS and $SO_2$, Z is a substituent selected from the group consisting of an alkylene group, an arylene group, an aralkylene group, $-NH-$, $-NHNH-$, $-OYO-$ and $-NHYNH-$ (wherein Y is a difunctional organic group having 1–12 carbon atoms) and n is 0 or 1.))

This specific unique polyurethane elastomer is critical in obtaining the advantages that are present in this invention.

We have found that an organic block having the structure RNHCONHNHCONHR (wherein R is an organic group having no direct bond between aromatic ring and adjacent nitrogen atom) not only has good weathering properties and good discoloring resistance, but also hinders the deterioration of polyurethanes containing easily degradative blocks comprising the reaction product of aromatic diisocyanate and/or aromatic diamine within the molecular chain.

We have accordingly succeeded in obtaining an excellent composite sheet material by applying to the fibrous structure a specific polyurethane elastomer which includes a certain amount of an aromatic diisocyanate and/or an aromatic diamine which are indispensable elements to obtain a composite sheet material having good mechanical properties, good repulsive elasticity and heat resistance, and which importantly includes a certain amount of an organic block comprising the reaction product of aliphatic diisocyanate and hydrazine and/or its derivatives having the formula (I).

DISCUSSION OF THE PRIOR ART

It has already been proposed to use hydrazine or a mixture of hydrazine and other diamines as the chain extender during manufacture of polyurethane elastomer (see U.S. Pat. Nos. 3,708,453 and 2,957,852). It has also been suggested to use both aromatic and aliphatic or alicyclic diisocyanates as the diisocyanate component in these prior patents. Further it has been mentioned that the chain extending reaction may be carried out stepwise. But it has not been indicated in these prior art patents that a certain amount of a specific organic block comprising the reaction product of aliphatic diisocyanate and hydrazine and/or its derivatives having the formula (I) may advantageously be deliberately introduced into the polyurethane elastomer molecular chain. And the specific and usable dihydrazides in U.S. Pat. No. 3,708,453 differ entirely from those utilized in the practice of this invention.

DETAILED DESCRIPTION OF THIS INVENTION

The polymeric diol of this invention, which is a component of the polyurethane elastomer, is hydroxy-terminated at both ends of the molecule and has a molecular weight of at least about 800-5000, preferably about 1000-4000 and preferably has a melting point of below about 70° C. It is selected from the group consisting of polyester glycol, polyether glycol, polyetherester glycol, polyacetal glycol, polybutadiene glycol, etc. Representative polymeric diols include polyethylene adipate, polypropylene adipate, polytetramethylene adipate, polyhexamethylene adipate, polycaprolactone glycol, polyethylene oxide glycol, polypropylene oxide glycol, polytetramethylene oxide glycol and mixtures thereof.

The aromatic diisocyanate has an isocyanato group directly bonded to the aromatic ring and may include phenylene diisocyanate, toluylene diisocyanate, diphenylmethane-4,4′-diisocyanate, diphenyl dimethylmethane-4,4′-diisocyanate, naphthylene diisocyanate, diphenyl diisocyanate and mixtures thereof. Diphenylmethane-4,4′-diisocyanate is most preferable.

The aliphatic diisocyanate (one which has no direct bond between an aromatic ring and an isocyanato group) may include a linear diisocyanate such as ethylenediisocyanate, tetramethylenediisocyanate, hexamethylenediisocyanate or lysinediisocyanate, an alicyclic diisocyanate such as cyclohexanediisocyanate, isophoronediisocyanate, dicyclohexylmethane-4,4′-diisocyanate and dicyclohexyldimethylmethane-4,4′-diisocyanate, or an araliphatic diisocyanate such as m-xylylenediisocyanate or p-xylylenediisocyanate, for example. When an alicyclic diisocyanate or an araliphatic diisocyanate are used, the resulting fibrous sheet has good mechanical properties and elaborate hand characteristics, and when a linear aliphatic diisocyanate is used, the resulting fibrous sheet has improved suppleness and more flexible hand characteristics. Mixtures of these aliphatic diisocyanates may be used in the practice of this invention. Isophoronediisocyanate, dicyclohexylmethane-4,4′-diisocyanate, hexamethylenediisocyanate and/or xylylenediisocyanate are preferred.

The chain extender of this invention comprises hydrazine and/or its derivatives having the formula (I) and other chain extenders. Said hydrazine and/or its derivatives having the formula (I) may include hydrazine, methylhydrazine, phenylhydrazine, benzylhydrazine, carbodihydrazide, thiocarbodihydrazide, sulphodihydrazide, dicarboxylic acid dihydrazide (for example dihydrazide of adipic acid, sebacic acid, terephthalic acid, isophthalic acid, cyclohexane-1,3-dicarboxylic acid, or cyclohexane-1,4-dicarboxylic acid), ethylenebissemicarbazide, tetramethylenebissemicarbazide, piperazinedicarboxylic acid dihydrazide, aminoacetic acid hydrazide, α-aminopropionic acid hydrazide β-aminopropionic acid hydrazide, p-aminobenzoic acid hydrazide and mixtures thereof. Hydrazine hydrate, which is less dangerous, may be used instead of hydrazine.

Other chain extenders may include aromatic diamines such as p-phenylendiamine, m-phenylenediamine, toluylenediamine, naphthylenediamine, 4,4′-diaminodiphenylmethane, 4,4′-diaminodiphenylether, 4,4′-diaminodiphenylthioether, 4,4′-diaminodiphenylsulfone, 4,4′-diamino-3,3′-dimethyldiphenylmethane, 4,4′-diamino-3,3′-dichlorodiphenylmethane and 4,4′-diaminodiphenyldimethylmethane, preferably p-phenylenediamine, 4,4′-diaminodiphenylmethane, 4,4′-diaminodiphenyl ether, 4,4′-diaminodiphenyl-3,3′-dimethylmethane, 4,4′-diaminodiphenyldimethylmethane and mixtures thereof, an aliphatic diamine such as ethylenediamine, propylenediamine, menthanediamine, isophoronediamine, cyclohexylenediamine, 4,4′-diaminodicyclohexylmethane, 4,4′-diamino-3,3′-dimethyldicyclohexylmethane and xylylene diamine, and a glycol such as ethylene glycol, propylene glycol, butylene glycol, 1,4-cyclohexane diol or 1,3-cyclohexane diol.

The amount of hydrazine and/or its derivative having the formula (I) in the total chain extenders is more than 2 mol %, preferably 2-90 mol %, more preferably 5-70 mol %, and still more preferably 5-45 mol %.

The polyurethane elastomer used in this invention may be prepared by reacting the above mentioned polymeric diol, organic diisocyanates and chain extender.

In the preparation of the polyurethane elastomer certain essential conditions should be fulfilled.

(1) It is essential that the molar ratio of the aromatic diisocyanate and the aromatic diamine to the total organic diisocyanate and chain extender should be about 30-80%, preferably 45-75%, more preferably 55-75%, so that about 30-80%, preferably 45-75%, more preferably 55-75% of the carbon atoms which are bonded to nitrogen atoms constituting the ureylene bond and/or urethane bond of the polyurethane elastomer constitute benzene and/or naphthalene ring skeletons.

(2) It is essential that about 2-70%, preferably 5-50%, more preferably 5-30% of the ureylene bonds of the polyurethane elastomer are formed by the reaction of aliphatic diisocyanate and hydrazine and/or its derivatives having the formula (I).

The polyurethane elastomer may be prepared by the following methods to satisfy the foregoing critical conditions.

First 1.5-5.0 mol equivalent, preferably 1.8-4.0 mol equivalent to polymeric diol of an organic diisocyanate which contains about 2-70%, preferably 5-50%, more preferably 5-30% of an aliphatic diisocyanate is reacted with a polymeric diol to prepare a prepolymer, and said prepolymer is reacted with 0.8-1.7, preferably 0.9-1.5, more preferably 1.0-1.5 mol equivalent (to the isocyanato group in prepolymer) of a chain extender. In the chain extending reaction, a chain extender other than hydrazine and/or its derivative having the formula (I), such as aromatic diamine, etc. is initially reacted, then said hydrazine and/or its derivative having the formula (I) is reacted. Because the aliphatic diisocyanate reacts with the chain extender more slowly than does the aromatic diisocyanate, the stepwise chain extending reaction described above forms ureylene bonds by the reaction of the aliphatic diisocyanate and hydrazine and/or its derivative having the formula (I), and accordingly creates a polyurethane elastomer having good weathering properties and good discoloring resistance when exposed to nitrogen oxide gas or internal engine exhaust gases.

All of the organic diisocyanates involved in this invention may be reacted at once with the polymeric diol as described above, but other methods are also effective, as follows.

Some portions of the aliphatic diisocyanate may be added at any stage after the preparation of the prepolymer and before the chain extension by the hydrazine or its derivative having the formula (I). As at least 1.5 mol equivalent of organic diisocyanate is required for the preparation of the prepolymer even in this case, the amount of remaining organic diisocyanate other than aliphatic diisocyanate which is added at a later stage must be at least 1.5 mol equivalent.

Further, some portions of the aliphatic diisocyanate may be reacted with the hydrazine beforehand. In this case the two following methods are effective.

First, the aliphatic diisocyanate may be reacted with hydrazine and/or its derivative having the formula (I) to prepare the isocyanate-terminated compound, and said compound may be used as the isocyanate component in the preparation of the prepolymer. The amount of hydrazine and/or its derivative having the formula (I) is $\frac{3}{4}$–1/10 mol equivalent (to the isocyanate) in order to prepare the isocyanate-terminated compound.

As another procedure, an excess amount of hydrazine and/or its derivative having the Formula (I) may be reacted with the aliphatic diisocyanate to prepare a hydrazine-terminated compound, and said compound may be used as a part of the chain extender. Said compound may be added as a chain extender at any stage before, during or after the first chain extending reaction, preferably after the first chain extending reaction. In this latter case, said compound could be all of the chain extender which should be used in the second chain extending reaction instead of hydrazine and/or its derivative having the formula (I). The amount of hydrazine and/or its derivative having the formula (I) is 4/3–50, preferably 2–10 mol equivalents (to the aliphatic diisocyanate) in order to prepare the hydrazine-terminated compound.

The solvent for the polyurethane elastomer of this invention is not restricted in nature, so long as it is capable of dissolving the elastomer. Suitable solvents may include dimethylformamide, dimethylacetamide, hexamethylphosphoramide, dimethylsulfoxide, diethylformamide, dioxane, tetrahydrofuran, o-chlorophenol and mixtures thereof. Among these dimethylformamide, dimethylacetamide and dimethylsulfoxide are preferred.

It is of course useful during the preparation of the polyurethane elastomer of this invention to add certain catalysts such as tertiary amines (for example triethylenediamine) and organic metal compounds such as dibutyltindilaurate, for example, as described in S. L. Reegen and K. C. Frisch, "Advances in Urethane Science and Technology", 1 (1971) Technomic Pub. Co. Inc.

A certain amount of monofunctional amine or alcohol may be added before, during or after the chain extending reaction to adjust the degree of polymerization of the polyurethane elastomer.

The polyurethane elastomer obtained by any of the above mentioned methods of preparation are novel polymeric compounds which have good mechanical properties such as high tensile strength, high elongation at break, suitable moduli as well as repulsive elasticity, good resistance to the effects of hot water, good weathering properties and good discoloring resistance in the presence of nitrogen oxide gas or exhaust gases of automobiles, for example.

It can readily be determined whether a given polyurethane elastomer meets the previously described essential conditions of this invention regarding (1) molar ratio of aromatics to total diisocyanate and chain extender and (2) percentage of ureylene bonds formed from the reaction of aliphatic diisocyanate and hydrazine and/or its derivatives having the Formula (I).

Essential condition (1) can be quantitatively confirmed by gas chromatography measurement after hydrolysis or by the so-called $^{13}$C-NMR measurement (as described for example in "Kobunshi no NMR (II), 168 ('75) Kagaku-Dojin Pub. Co., Inc.".

As regards the confirmation of essential condition (2), the ratio of the hydrazide block formed by the reaction of aliphatic diisocyanate and hydrazine and/or its derivative having the formula (I) to the hydrazide block formed by the reaction of aromatic diisocyanate and hydrazine and/or its derivative having the formula (I) may be quantitatively determined by spectroscopy, particularly by the 1590–1660 cm$^{-1}$ of the characteristic absorption bonds of amide groups in infrared spectroscopy (as described for example in C. S. P. Sung et al, Macromolecules, 8, 68 (1975)) and by the characteristic absorption of carbon atom of the carbonyl group of the hydrazide in terms of $^{13}$C-NMR spectroscopy.

The polyurethane elastomer which is used in this invention is further improved with respect to resistance to discoloring in the presence of nitrogen oxide gas or motor vehicle exhaust gases by introducing the following unit having the formula (II) and/or formula (III) into the molecular chain.

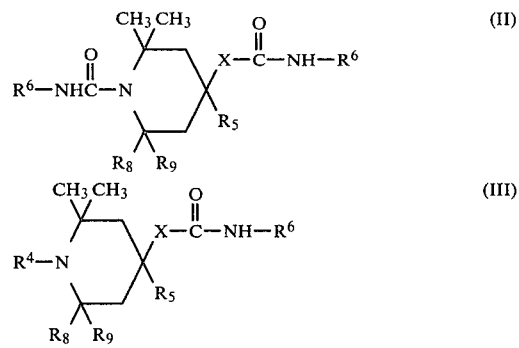

wherein $R^4$ is a substituent selected from the group consisting of hydrogen, alkyl or aryl group containing 1–12 carbon atoms, benzyl group and benzyl group substituted with halogen, alkyl and/or alkoxy group having 1–12 carbon atoms. $R^5$ is a substituent selected from the group consisting of hydrogen, alkyl group having 1–12 carbon atoms, phenyl group, phenyl group substituted with halogen, alkyl and/or alkoxy group having 1–12 carbon atoms, benzyl group, benzyl group substituted with halogen, alkyl and/or alkoxy group having 1–12 carbon atoms, and cyano group. $R^6$ is a residue of organic polyisocyanate. X is —O— or —NR$^7$— (wherein $R^7$ is a substituent selected from the group consisting of hydrogen, alkyl group having 1–12 carbon atoms and phenyl group). $R^8$ and $R^9$ are the same or different alkyl groups having 1–3 carbon atoms, or together form an alicyclic five-membered or six-membered ring.

Said polyurethane elastomer is obtained by using a hindered amine compound having the formula (IV) as a part of the chain extender or chain terminator.

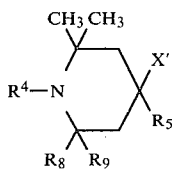

(IV)

wherein $R^4$, $R^5$, $R^8$ and $R^9$ are the same as described above, X' is a substituent selected from the group consisting of hydroxyl, amino, monoalkyl amino and amino or monoalkylamino whose hydrogen(s) bonded to nitrogen and/or oxygen atom is (are) substituted by $-(R^{10}O)_n-H$ and/or $-(COR^{11}COOR^{12}O)_m-H$ wherein $R^{10}$ is a lower alkylene group, $R^{11}$ is a residue of an organic dicarboxylic acid, $R^{12}$ is a residue of an organic diol, n is an integer from 1 to 50 and m is an integer from 1 to 15.

In the foregoing formulas, reference to the monoalkylamino group of substituent X' means an amino group having its hydrogen substituted by a lower alkyl group having 1-12 carbon atoms, or the phenyl group.

The hindered amine compound having the formula (IV) of this invention may include 2,2,6,6-tetramethyl-4-hydroxy piperidine, 2,2,6,6-tetramethyl-4-amino piperidine, 2,2,6,6-tetramethyl-4-methyl-4-hydroxypiperidine, 2,2,6,6-tetramethyl-4-methyl-4-aminopiperidine, 2,2,6-trimethyl-6-ethyl-4-aminopiperidine, 2,2-dimethyl-6,6-diethyl-4-aminopiperidine, 2,2,6,6-tetramethyl-4-ethyl-4-hydroxypiperidine, 2,2,6,6-tetramethyl-4-ethyl-4-aminopiperidine, 2,2,6,6tetramethyl-4-phenyl-4-hydroxypiperidine, 2,2,6,6-tetramethyl-4-phenyl-4-aminopiperidine, 2,2,6,6-tetramethyl-4-cyano-4-hydroxypiperidine, 2,2,6,6-tetramethyl-4-cyano-4-aminopiperidine, 2,2,6,6-tetramethyl-4-benzyl-4-hydroxypiperidine, 2,2,6-trimethyl-6-ethyl-4-hydroxypiperidine, 2,2-dimethyl-6,6-diethyl-4-hydroxypiperidine, 2,2,6,6-tetramethyl-4-benzyl-4-aminopiperidine, 1-benzyl-2,2,6,6-tetramethyl-4-hydroxypiperidine, 1-benzyl-2,2,6,6-tetramethyl-4-aminopiperidine, 1-benzyl-2,2,6,6-tetramethyl-4-methyl-4-hydroxypiperidine, 1-benzyl-2,2,6,6-tetramethyl-4-methyl-4-methyl-4-aminopiperidine, 1-benzyl-2,2,6,6-tetramethyl-4-ethyl-4-hydroxypiperidine, 1-benzyl-2,2,6,6-tetramethyl-4-ethyl-4-aminopiperidine, 1-benzyl-2,2,6,6-tetramethyl-4-phenyl-4-hydroxypiperidine, 1-benzyl-2,2,6,6-tetramethyl-4-phenyl-4-aminopiperidine, 1-benzyl-2,2,6,6-tetramethyl-4-cyano-4-hydroxypiperidine, 1-benzyl-2,2,6,6-tetramethyl-4-cyano-4-aminopiperidine, 1-benzyl-2,2,6,6-tetramethyl-4-benzyl-4-hydroxypiperidine, 1-benzyl-2,2,6,6-tetramethyl-4-benzyl-4-aminopiperidine, 2,2,6,6-tetramethyl-4-aminomethylpiperidine, 2,2,6,6-tetramethyl-4-aminoethylpiperidine, 2,2,6,6-tetramethyl-4-aminophenylpiperidine, 1-benzyl-2,2,6,6-tetramethyl4-aminomethylpiperidine, 1-benzyl-2,2,6,6-tetramethyl-4-aminoethylpiperidine, 1-benzyl-2,2,6,6-tetramethyl-4-aminophenylpiperidine and mixtures thereof. Among these 2,2,6,6-tetramethyl-4-hydroxypiperidine, 2,2,6,6-tetramethyl-4-methyl-4-hydroxypiperidine, 2,2,6,6-tetramethyl-4-ethyl-4-hydroxypiperidine, 2,2,6,6-tetramethyl-4-phenyl-4-hydroxypiperidine, 2,2,6,6-tetramethyl-4-aminopiperidine and mixtures thereof are preferred. Also, 1-benzyl-2,2,6,6-tetramethyl-4-hydroxypiperidine, 1-benzyl-2,2,6,6-tetramethyl-4-ethyl-4-hydroxypiperidine, 1-benzyl-2,2,6,6-tetramethyl-4-phenyl-4-hydroxypiperidine, 1-benzyl-2,2,6,6-tetramethyl-4-aminopiperidine and mixtures thereof are also preferable. 2,2,6,6-Tetramethyl-4-hydroxypiperidine, 2,2,6,6-tetramethyl-4-aminopiperidine, 1-benzyl-2,2,6,6-tetramethyl-4-hydroxypiperidine, 1-benzyl-2,2,6,6-tetramethyl-4-aminopiperidine and mixtures thereof are more preferable. 2,2,6,6-Tetramethyl-4-hydroxypiperidine, 2,2,6,6-tetramethyl-4-aminopiperidine and mixtures thereof are more preferable.

Instead of the hindered amine compounds described above, their derivatives may be used having at least one hydrogen atom bonded to oxygen or nitrogen atom of the substituent denoted by X of the formula (IV) substituted by $-(R^{10}O)_n-H$ or $-(COR^{11}COR^{12}O)_m H$. $R^{10}$ is an alkylene group having 2-10 carbon atoms and n is an integer from 1 to 50, and m is an integer from 1 to 15. The former derivatives are prepared by reacting the original hindered amine compound with an alkyleneoxide ($R^{10}O$), such as ethylene oxide, propylene oxide, tetrahydrofuran, styrene oxide, epichlorohydrine, etc., and mixtures thereof. $R^{11}$ is the residue of an organic dicarboxylic acid having 2-12 carbon atoms, such as succinic acid, fumaric acid, maleic acid, adipic acid, azelaic acid, sebacic acid, terephthalic acid, isophthalic acid, etc., their anhydrides or mixtures thereof. $R^{12}$ is the residue of an organic diol having 2-8 carbon atoms such as ethyleneglycol, propyleneglycol, butyleneglycol, hexane diol, octane glycol, diethyleneglycol, triethyleneglycol, etc., and mixtures thereof.

When a hindered amine compound as described above is monofunctional, its amount may be restricted as it terminates the chain extending reaction. The amount of hindered amine compound in relation to isocyanato group of the prepolymer is preferably below about 20 mol %, more preferably below 15 mol %, most preferably 1-12 mol %. Other monofunctional chain terminators, such as monofunctional amines and monofunctional alcohols, may also be employed.

When the hindered amine compound described above is difunctional, its amount is not restricted so long as the aforementioned two essential conditions (1) and (2) are fulfilled. However, when R' of said hindered amine compound is hydrogen, excessive use of said compound sometimes brings inferior mechanical properties to the polyurethane elastomer and causes a viscosity decrease in the solution of polyurethane. Accordingly, the amount of said hindered amine compound in relation to the total chain extender is preferably below about 30 mol %, more preferably below 20 mol %, most preferably 1-12 mol %.

When said hindered amine compound is trifunctional, excessive use brings about increased viscosity or sometimes gelation. Accordingly the usable amount of said compound should be restricted according to the application. Generally, it is used in an amount below about 10 mol % based upon mols of the chain extender. It is of course possible to use various types of hindered amine compounds at the same time.

Fibrous sheet material which is usable in accordance with this invention may be any of woven fabric, knitted fabric or non-woven fabric, and preferably may be formed of bundles of superfine filaments or fibers. The expression "superfine" as used herein means below 2.0 denier, preferably bundles of at least 5 superfine filaments or fibers. A multicomponent fiber that forms a bundle of superfine denier fibers by elimination of at least one component may preferably be used in the practice of this invention. Bundles of superfine filaments or fibers which result from processing special islands-in-a-sea type multicomponent filaments or fibers by eliminating the sea component, as described in U.S. Pat. No. 3,531,368 and U.S. Pat. No. 4,008,344, are especially suitable. Another type of multicomponent filament or fiber, such as a polymer blend type filament or fiber, or a partition type fiber, may also be used.

Fibrous sheet material used in this invention may be obtained by forming a sheet, such as by needle punching, weaving or knitting the above described multicomponent filaments or fibers, and eliminating one of the component polymers by use of solvent, or peeling apart the components mechanically, to make the bundles of superfine filaments or fibers in the sheet.

There are various methods for manufacturing a composite sheet material prepared by impregnating or coating the polyurethane elastomer to a fibrous sheet. One representative method is described as follows. A nonwoven web formed from the above mentioned multicomponent filaments or fibers, such as islands-in-a-sea type filaments or fibers, is intertwined by needle-punching or other methods and subsequently the soluble component of the filament or fiber is extracted by use of a solvent to yield a non-woven fabric composed of superfine filaments or fibers of polyethylene terephthalate. Said non-woven fabric is impregnated with the solution of the polyurethane elastomer of this invention, is wet-coagulated with water which extracts the solvent and is dried and buffed on its surface to give a napped sheet. Said napped sheet is preferably dyed by passing through a venturi-nozzle repeatedly with exposure to a dyeing fluid to give the sheet a crumpled effect. Another preferred method comprises dissolving the soluble component of the islands-in-a-sea type filament or fiber subsequent to the process of polyurethane impregnation. This is followed by extraction of solvent, then buffing and dyeing as described. A more preferred method comprises applying an aqueous solution of water soluble polymer, such as polyvinylalcohol, starch or carboxymethylcellulose, to the non-woven fabric sheet of the islands-in-a-sea fibers, then dissolving the soluble component of said fibers, impregnating said fibrous sheet with the solution of polyurethane elastomer of this invention, wet-coagulating with water, extracting the solvent and the water soluble polymer by hot water, buffing and dyeing. Slicing and pressing steps may be applied to adjust the thickness of the sheet at any suitable stage. Before the buffing step, a specific silicone polymer may be applied to the sheet to obtain naps of a suitable length and appearance. The amount of polyurethane elastomer may be determined according to the quality or use of the composite sheet and is generally about 5–200% by weight of the fibrous sheet.

It is of course possible to add a stabilizer, a pigment, carbon black, an adjusting agent for controlling the porous structure of the polyurethane elastomer, etc. into the solution of said polyurethane elastomer. Water repellent agents, softeners and electrostatic retardants may be applied to the composite sheet material of this invention.

The composite sheet material of this invention prepared by the method described above has good flexibility and a supple touch, and has excellent tear and wear-resistance and little deformation after extended periods of wear. In addition, it has excellent resistance to discoloration when exposed to internal combustion engine exhaust gases, or nitrogen oxide gas, for example. The napped sheet of this invention keeps its original appearance, continuing to show a graceful "writing effect" of finger marks, even after long periods of wear.

The provision of a synthetic leather with a top coated layer is also included in this invention. This is realized by coating with a polyurethane elastomer of this invention. Such a top coated type composite sheet has the excellent properties described above and further has good crack resistance on its coated surface.

This invention is further illustrated by the following Examples in which a composite sheet material impregnated and/or coated by the polyurethane elastomer is evaluated by measurements as follows. These Examples are intended to be illustrative but not to limit the scope of the invention, which is defined in the appended claims.

The following test methods and procedures will be referred to in the Examples:

Weathering Deterioration Test

A sample is irradiated by use of a Sunshine Weather Meter manufactured by Suga Testing Machine Co. Inc., for the required time at 60°–70° C. and exposed to air containing 70% moisture.

Tensile Strength

A sample (20×100 mm) is measured by use of a Tensilon UTM-III-100 tester, manufactured by Toyo Baldwin Co. Inc.

Abrasion at Break by Inflated Diaphragm Abrasion Tester

The surface of the napped sheet is abraded by use of an inflated diaphragm abrasion tester manufactured by Shimazu Co. Ltd., and the number of cycles until the center of the abrasion area of the specimen is torn off is measured. The abrasion test is carried out using Emery Paper #800 as an abradant. The pressure under the diaphragm is 4 lb/in$^2$, the rate of abrasion strokes is 125 strokes/min., and the vertical pressure is 1 lb.

A high number shows good abrasion resistance at the break.

Abrasion by Shiefer Abrasion Testing Machine

The surface of the napped sheet is abraded by use of a Shiefer abrasion tester manufactured by San-ei Sokki Co. Inc., using a nylon brush abradant. The angular velocity of abradant is 59.5 rpm, the angular velocity of the specimen is 61.5 rpm, and the vertical pressure is 8 lbs.

After 60 cycles of abrasion of the specimen, the degree of abrasion was judged according to 5 standards. For example, the number 3 corresponds to the abrasion state of the specimen abraded 2/5 times the cycles of abrasion at the break.

Pilling Test

Pilling is measured by a pilling tester manufactured by I.C.I. Co. Inc. in accordance with Japanese Industrial Standard (JIS) L 1076. A high number shows good pilling resistance.

Pilling after Actual Wear

Jumpers were sewn of each specimen and were worn for 3 months. Pilling of the collar and elbow portions was judged. Further, in the examples, abbreviations will be used in the interest of brevity. The abbreviations and their meanings are listed hereinafter.

PTHF: Polytetramethyleneoxide glycol
PCL: Polycaprolactone glycol

MDI: Diphenylmethane-4,4'-diisocyanate
TDI: Toluylenediisocyanate
RMDI: Dicyclohexylmethane-4,4'-diisocyanate
IPDI: Isophorone diisocyanate
HH: Hydrazine hydrate
IPH: Isophthalic acid dihydrazide
ADH: Adipic acid dihydrazide
MBA: 4,4'-diaminodiphenylmethane
DAE: 4,4'-diaminodiphenyl ether
DMF: N,N-dimethylformamide

EXAMPLES 1–6

A nonwoven polyethylene terephthalate web was made from islands-in-a-sea type staple fibers of 3.4 denier, 51 mm in length, 5 crimps/in., drawn at a ratio of 2.3, which comprised 50 parts of islands component of said polyethyleneterephthalate and 50 parts of sea component of polystyrene, said islands component being distributed as 16 islands-in-the-sea component when viewed as a cross-section of the fiber. The process of carding and cross-rapping was used in making the web. Subsequent needle-punching produced a nonwoven fabric. The nonwoven fabric was immersed in a 20% aqueous solution by weight of polyvinylalcohol, dried and its sea component (polystyrene) extracted with perchloroethylene to yield a nonwoven fabric comprising superfine denier fibers.

An isocyanate terminated intermediate called a "prepolymer" was prepared by the reaction of 1 mol of PTHF having a molecular weight of 2004 and 2.2 mol equivalents of a mixed diisocyanate MDI and RMDI in a molar ratio of 7:3 for 100 min. at 80° C. under stirring and was dissolved in DMF to yield a solution of 50% by weight. A mixture of 0.6 mol equivalent of MBA, 0.027 mol equivalent of n-butylamine and DMF was added to said 50% solution and reacted for 5 hrs. at 40° C. Then, a mixture of 0.26 mol equivalent of HH and DMF was added slowly and reacted for 4 hrs. at room temperature to give a 14% solution of a polyurethane elastomer of this invention.

The nonwoven fabric obtained by the method described above was immersed in the polyurethane elastomer solution, squeezed between rollers, coagulated with water for 1 hour, treated with hot water at 80° C. to extract the solvent and polyvinylalcohol, dried, sliced to a thickness of 1.1 mm and buffed to nap the sheet. The napped sheet having a thickness of 0.85 mm was dyed in dyeing equipment called "Circular" manufactured by Hisaka Works Co. Ltd., said sheet passing through the venturi-nozzle for 1 hour at 125° C., with the aqueous solution containing 2% o.w.f. of a disperse dye (Kayalon polyester gray NG). The napped sheet of this invention having a density of 0.250 g/cm³ was obtained by finish brushing of said dyed sheet. The napped sheets of Examples 2 to 6 were obtained in the same manner as explained above, except for using different polyurethane elastomers as shown in Table 1.

For the purpose of comparison, a napped sheet was obtained in the same manner as explained above except for using a polyurethane elastomer comprising PTHF, MDI and MBA (Comparison 1). For the purpose of another comparison, a napped sheet was obtained in the same manner as explained above except for using a polyurethane elastomer comprising PTHF, MDI and HH (Comparison 2). For the purpose of still another comparison, a napped sheet was prepared in the same manner as explained above except for using a polyurethane elastomer obtained by use of PTHF, RMDI and HH (Comparison 3). The napped sheet of Comparison 3 was partly torn in the dyeing process, and on the whole the naps were disordered and torn away in some parts to yield a sheet which could not even be considered a suede leather. The properties of said sheet were so poor that they are not shown in Table 1.

Furthermore, for comparison, a napped sheet was obtained in the same manner as explained above except for using a polyurethane elastomer comprising a mixture of polymeric diols consisting of PTHF and PCL, MDI and MBA (Comparison 4).

The properties of these napped sheets are shown in Table 1. The results in Table 1 explicitly show that the sheets of this invention have good tensile strength retention after exposure to weather and have good abrasion and pilling resistance. Furthermore, the tests showed good pilling resistance in collar and sleeve portions in practical wear tests.

EXAMPLE 7

50 denier/48 filament yarns of polyethyleneterephthalate were knitted on a tricot knitting machine to produce a knitted fabric having a knitted density of 70 warps/in. and 28 wefts/in.

Said knitted fabric was dyed in "circular" dyeing equipment with a disperse dye, a finishing oil was applied and the fabric was raised by a surface nap raising machine. Subsequently, it was immersed in a 7% aqueous solution of polyvinyl alcohol, dried, impregnated in a 7% DMF solution of the polyurethane elastomer of Example 1, squeezed by rollers, wet-coagulated, polyvinyl alcohol and solvent were extracted with water, and the product dried. The resulting sheet was surface buffed by sandpaper to give a napped sheet. The properties of the sheet appear in Table 2.

EXAMPLE 8

Napped sheets of this invention and of the Comparisons were obtained in the same manner as explained in Example 7 using various different polyurethane elastomers as stated in Table 2. The properties of products of Examples 7 and 8, and of the Comparisons, are shown in Table 2. The results in Table 2 explicitly show that the sheets of this invention have good abrasion and pilling resistance after exposure to a weather meter.

EXAMPLE 9

The unsliced sheet of Example 1 was sliced into 1.5 mm. thickness to produce a base sheet material for a coated leather. A coating material obtained by mixing 3% of carbon black into the 25% DMF solution of the polyurethane elastomer of Example 1 was applied to said base sheet material in a thickness of 0.5 mm, was wet-coagulated with water for 30 min., the solvent was then extracted with hot water for 30 min., and the product was dried for 1 hour at 100° C. to produce a synthetic leather. For a comparison, a synthetic leather was obtained in the same manner as explained above except using a polyurethane elastomer of Comparison 1 (Comparison 7).

Both synthetic leathers were exposed to the effects of a weather meter for 50 hours and evaluations were made of the surface crack resistances by measuring the number of occurrences of cracks using a flexometer in accordance with Japanese Industrial Standard (JIS) K-6545. The results are shown in Table 3.

The values in Table 3 explicitly show that surfaces obtained by using polyurethane elastomers of this invention have remarkably improved crack resistance.

TABLE 1

| | COMPOSITION OF POLYURETHANE ELASTOMER | | | | | | | PROPERTIES OF NAPPED SHEET (AFTER DYEING) | | | |
|---|---|---|---|---|---|---|---|---|---|---|---|
| | Polymeric Diol: Molecular Weight (Wt. %) | Organic Diisocyanate | | Chain Extender (mol %) | | Viscosity (poise) | Density (g/cm$^3$) | Tensile Strength (kg/cm$^2$) | | Abrasion at break by inflated Diaphragm (No. of strokes) | Abrasion by Shiefer type (Class) |
| | | Aromatic (mol %) | Aliphatic (mol %) | Hydrazine Derivative | Others | | | Lengthwise | Widthwise | | |
| EXAMPLE 1 | PTHF 2004 (100) | MDI (70) | RMDI (30) | HH (30) | MBA (70) | 280 | 0.250 | 7.54 | 6.92 | 7.61 | 3.5 |
| COMPARISON 1 | PTHF 1964 (100) | MDI (100) | — | — | MBA (100) | 250 | 0.248 | 7.70 | 6.82 | 701 | 3.0 |
| COMPARISON 2 | PTHF 2004 (100) | MDI (100) | — | HH (100) | — | 302 | 0.251 | 7.38 | 6.71 | 589 | 2.5 |
| EXAMPLE 2 | PHTF 2004 (50) PCL 1982 (50) | MDI (90) | RMDI (10) | IPH (30) | MBA (70) | 308 | 0.250 | 7.90 | 6.73 | 812 | 4.0 |
| COMPARISON 4 | PTHF 2004 (50) PCL 1982 (50) | MDI (100) | — | — | MBA (100) | 265 | 0.253 | 8.10 | 7.02 | 793 | 3.5 |
| EXAMPLE 3 | PTHF 2004 (75) PCL 1982 (25) | MDI (90) | IPDI (10) | HH (30) | MBA (70) | 163 | 0.250 | 7.03 | 6.70 | 650 | 3.5 |
| EXAMPLE 4 | PCL 1982 (100) | MDI (90) | RMDI (10) | ADH (30) | DAE (70) | 195 | 0.254 | 7.71 | 6.94 | 811 | 3.5 |
| EXAMPLE 5 | Polybutylene Adipate 1880 (100) | MDI (90) | RMDI (10) | HH (20) | MBA (80) | 403 | 0.253 | 7.42 | 6.83 | 726 | 3.0 |
| EXAMPLE 6 | Polyethylene Adipate 2040 (100) | TDI (90) | RMDI (10) | HH (20) | MBA (80) | 198 | 0.259 | 7.92 | 6.69 | 613 | 3.5 |

| | PROPERTIES OF NAPPED SHEET AFTER EXPOSURE TO WEATHER METER FOR 100 HRS. | | | | |
|---|---|---|---|---|---|
| | Retention of Tensile strength (%) | | Retention of Abrasion at break (%) | Abrasion by Shiefer type (Class) | Pilling after practical wear |
| | Lengthwise | Widthwise | | | |
| EXAMPLE 1 | 81 | 86 | 79 | 2.5 | △ fair |
| COMPARISON 1 | 63 | 72 | 62 | 1 | X poor |
| COMPARISON 2 | 61 | 64 | 59 | 1 | X poor |
| EXAMPLE 2 | 93 | 95 | 90 | 3.0 | ○ good |
| COMPARISON 4 | 61 | 69 | 70 | 1.5 | X poor |
| EXAMPLE 3 | 91 | 96 | 89 | 2.5 | △-○ fairly good |
| EXAMPLE 4 | 95 | 94 | 91 | 3.0 | ○ good |
| EXAMPLE 5 | 90 | 89 | 92 | 3.0 | ○ good |
| EXAMPLE 6 | 86 | 85 | 80 | 2.5 | ○ good |

TABLE 2

| | THE COMPOSITION OF POLYURETHANE ELASTOMER | | | | | PROPERTIES OF THE SHEET | | | | PROPERTIES OF THE SHEET AFTER THE EXPOSURE TO WEATHER METER FOR 100 HRS. | | |
|---|---|---|---|---|---|---|---|---|---|---|---|---|
| | Polymeric diol: molecular weight (Wt. %) | Organic Diisocyanate (Mol %) | | Chain Extender (Mol %) | | Amount of Polyurethane (%) | Abrasion at break by Inflated Diaphragm type (No. of strokes) | Abrasion by Shiefer Type (Class) | Pilling Test (Class) | Retention of Abrasion at break (%) | Abrasion by Shiefer Type (Class) | Pilling Test (Class) |
| | | Aromatic | Aliphatic | Hydrazine derivative | Other | | | | | | | |
| EXAMPLE 7 | PTHF 2004 (100) | MDI (70) | RMDI (30) | HH (30) | MBA (70) | 12.9 | 1880 | 2.5 | 5 | 80 | 2.0 | 4 |
| COMPARISON 5 | PTHF 2004 (100) | MDI (100) | — | — | MBA (100) | 13.1 | 1790 | 2.5 | 5 | 64 | 1.0 | 2 |
| EXAMPLE 8 | PCL 1982 (100) | MDI (90) | RMDI (10) | HH (20) | MBA (80) | 14.2 | 1910 | 3.0 | 4 | 88 | 2.0 | 3 |
| COMPARISON | PCL 1982 | MDI | — | — | MBA | 14.1 | 1760 | 2.5 | 5 | 70 | 1.5 | 2 |

TABLE 2-continued

| | THE COMPOSITION OF POLYURETHANE ELASTOMER | | | | | PROPERTIES OF THE SHEET | | | PROPERTIES OF THE SHEET AFTER THE EXPOSURE TO WEATHER METER FOR 100 HRS. | | |
|---|---|---|---|---|---|---|---|---|---|---|---|
| | Polymeric diol: molecular weight (Wt. %) | Organic Diisocyanate (Mol %) | | Chain Extender (Mol %) | | Amount of Polyurethane (%) | Abrasion at break by Inflated Diaphragm type (No. of strokes) | Abrasion by Shiefer Type (Class) | Pilling Test (Class) | Retention of Abrasion at break (%) | Abrasion by Shiefer Type (Class) | Pilling Test (Class) |
| | | Aromatic | Aliphatic | Hydrazine derivative | Other | | | | | | | |
| SON 6 | (100) | (100) | | | (100) | | | | | | | |

TABLE 3

| Synthetic Leather | Crack Resistance Number of Occurrences of Surface Cracks | |
|---|---|---|
| | No Irradiation | Irradiation for 50 Hrs. |
| Example 9 | 700 × 10³ | 300 × 10³ |
| COMPARATIVE EXAMPLE 7 | 600 × 10³ | 30 × 10³ |

We claim:

1. A composite sheet material comprising a fibrous sheet which is impregnated and/or is coated with a polyurethane elastomer; wherein said polyurethane elastomer comprises the reaction product of (A) a polymeric diol having a molecular weight of about 800–5000, (B) a mixture of organic diisocyanates comprising
  (a) about 2–70 mole % aliphatic diisocyanate not having a direct bond between an aromatic ring and an isocyanato group, and
  (b) substantially the balance comprising an aromatic diisocyanate having a direct bond between an aromatic ring and an isocyanato group; and (C) a chain extender comprising hydrazine and/or a derivative thereof having the formula (I):

NH₂NHR    (I)

wherein R is a substituent selected from the group consisting of hydrogen, an alkyl group having 1–12 carbon atoms, an aryl group, an aralkyl group, an acyl group containing an amino group and groups having the formula —A—(ZA)$_n$—NHNH₂, wherein A is a substituent selected from the group consisting of CO, CS and SO₂, Z is a substituent selected from the group consisting of an alkylene group, an arylene group, an aralkylene group, —NH—, —NHNH—, —OYO— and —NHYNH—, wherein Y is a difunctional organic group having 1–12 carbon atoms and n is 0 or 1; and said chain extender also including another chain extender having two functional groups comprising amino and/or hydroxy groups, wherein about 30–80% of the carbon atoms which are bonded to nitrogen atoms constituting the ureylene and/or urethane bonds of said polyurethane elastomer constitute a benzene and/or naphthalene ring skeleton, and wherein about 2–70% of the ureylene bonds of said polyurethane elastomer are formed by the reaction of aliphatic diisocyanate and hydrazine and/or its derivatives having the Formula (I).

2. The composite sheet material of claim 1, wherein said fibrous sheet is composed mainly of fiber bundles of super-fine filaments or fibers having deniers of less than about 2.

3. The composite sheet material of claim 1, wherein said aromatic diisocyanate is selected from the group consisting of phenylene diisocyanate, toluylene diisocyanate, diphenylmethane-4,4′-diisocyanate, diphenyldimethylmethane-4,4′-diisocyanate, naphthylenediisocyanate, diphenyldiisocyanate, and mixtures thereof.

4. The composite sheet material of claim 1, wherein said aliphatic diisocyanate is selected from the group consisting of isophorondiisocyanate, dicyclohexylmethane-4,4′-diisocyanate, hexamethylenediisocyanate, xylylenediisocyanate, and mixtures thereof.

5. The composite sheet material of claim 1, wherein said compound having the formula (I) is selected from the group consisting of hydrazine, hydrazine hydrate, organic dicarboxylic acid dihydrazide, and mixtures thereof.

6. The composite sheet material of claim 1, wherein about 45–75% of the said carbon atoms which are bonded to nitrogen atoms constituting the ureylene and/or urethane bonds of said polyurethane elastomer constitute benzene and/or naphthalene ring skeletons.

7. The composite sheet material of claim 1, wherein about 55–75% of the said carbon atoms which are bonded to nitrogen atoms constituting the ureylene and/or urethane bonds of said polyurethane elastomer constitute benzene and/or naphthalene ring skeletons.

8. The composite sheet material of claim 1, wherein the ratio of said polyurethane elastomer to said fibrous sheet is 5:100–200:100 by weight.

9. The composite sheet material of claim 1, wherein said polyurethane elastomer is obtained by using a hindered amine compound having the Formula (IV) as a part of the chain extender and/or chain terminator

wherein R⁴ is a substituent selected from the group consisting of hydrogen, alkyl group or aryl group containing 1–12 carbon atoms, benzyl group and benzyl group substituted with an alkyl or alkoxy group having 1–12 carbon atoms and/or halogen, R⁵ is a substituent selected from the group consisting of hydrogen, alkyl group having 1–12 carbon atoms, phenyl group, phenyl group substituted with halogen, benzyl group, benzyl group substituted with halogen, alkyl and/or alkoxy group having 1-12 carbon atoms, and cyano group, $R^8$ and $R^9$ are the same or different alkyl groups having 1-3 carbon atoms, or together form an alicyclic five-membered or six-membered ring, and $X'$ is a substituent selected from the group consisting of hydroxyl, amino, monoalkylamino, and amino or monoalkylamino whose hydrogen(s) bonded to nitrogen and/or oxygen atom is substituted by $$-(R^{10}O)_n-H \text{ and/or } -(COR^{11}CO_2R^{12}O)_m-H$$

wherein $R^{10}$ is an alkyl group having 1-12 carbon atoms, $R^{11}$ is a residue of an organic dicarboxylic acid, $R^{12}$ is a residue of an organic diol, n is an integer from 1 to 50 and m is from 1-15.

10. The composite sheet material of claim 1, wherein said polymeric diol is selected from the group consisting of polyesterglycol, polyetherglycol, polyetheresterglycol, polyacetalglycol, polycarbonateglycol, polybutadieneglycol and mixtures thereof.

11. The composite sheet material of claim 10, wherein said polymeric diol has a molecular weight of about 1000-4000, and has a melting point below 70° C.

12. The composite sheet material of claim 11, wherein said polymeric diol is selected from the group consisting of polyethyleneadipate, polypropyleneadipate, polytetramethyleneadipate, polyhexamethyleneadipate, polycaprolactoneglycol, polyethyleneoxide glycol, polypropyleneoxide glycol, polytetramethyleneoxide glycol, and mixtures thereof.

13. The composite sheet material of claim 1, wherein the content of said ureylene bonds of said polyurethane elastomer which are formed by the reaction of aliphatic diisocyanate and hydrazine and/or its derivatives having formula (I) is 5-50%.

14. The composite sheet material of claim 13, wherein the content of said ureylene bonds of said polyurethane elastomer which are formed by the reaction of aliphatic diisocyanate and hydrazine and/or its derivatives having formula (I) is 5-30%.

15. The composite sheet material of claim 1, wherein said other chain extender is an aromatic diamine.

16. The composite sheet material of claim 15, wherein said aromatic diamine is selected from the group consisting of p-phenylenediamine, m-phenylenediamine, 4,4'-diaminodiphenylmethane, 4,4'-diaminodiphenyl ether, 4,4'-diaminodiphenyl-3,3'-dimethylmethane, 4,4'-diaminodiphenyldimethylmethane, and mixtures thereof.

* * * * *

UNITED STATES PATENT AND TRADEMARK OFFICE
CERTIFICATE OF CORRECTION

PATENT NO. : 4,286,014
DATED : August 25, 1981
INVENTOR(S) : Tanaka et al

It is certified that error appears in the above-identified patent and that said Letters Patent are hereby corrected as shown below:

Column 14, TABLE I, Example 1, delete "7.61" and insert --761--.

Column 3, line 63, delete "p-phenylendiamine and insert --p-phenylenediamine--.

Column 6, line 20, delete "8" and insert --8--.

Column 7, line 54, delete "tetramethyl4-" and insert --tetramethyl-4---.

Signed and Sealed this

Fifteenth Day of December 1981

[SEAL]

Attest:

Attesting Officer

GERALD J. MOSSINGHOFF

Commissioner of Patents and Trademarks